United States Patent
Robesky (10) Patent No.: US 7,386,114 B1
(45) Date of Patent: Jun. 10, 2008

(54) DISTRIBUTED SESSION-BASED DATA (75) Inventor: Kenneth A. Robesky, Mountain View, CA (US)

(73) Assignee: Shortel, Inc., Sunnyvale, CA (US)

( * ) Notice: Subject to any disclaimer, the term of this patent is extended or adjusted under 35 U.S.C. 154(b) by 492 days.

(21) Appl. No.: 10/754,424

(22) Filed: Jan. 8, 2004

(51) Int. Cl.
*H04M 3/04* (2006.01)
(52) U.S. Cl. .............................. 379/265.05; 379/32.01; 709/203
(58) Field of Classification Search .......... 379/112.02, 379/9, 88.22, 212.01, 265.04, 266.1, 35, 379/265.05, 32.01; 455/438; 719/315, 321; 709/203
See application file for complete search history.

(56) References Cited

U.S. PATENT DOCUMENTS

| | | | | |
|---|---|---|---|---|
| 5,555,299 A | * | 9/1996 | Maloney et al. ........ | 379/212.01 |
| 5,848,128 A | * | 12/1998 | Frey ............................... | 379/9 |
| 6,233,333 B1 | * | 5/2001 | Dezonmo ................ | 379/266.1 |
| 6,499,063 B1 | * | 12/2002 | Chessell et al. ............ | 719/315 |
| 6,952,830 B2 | * | 10/2005 | Madineni et al. ........... | 719/321 |
| 7,203,285 B2 | * | 4/2007 | Blair ....................... | 379/32.01 |
| 2003/0035532 A1 | * | 2/2003 | Ganesan et al. ........ | 379/265.04 |
| 2004/0082330 A1 | * | 4/2004 | Marin ........................ | 455/438 |

* cited by examiner

*Primary Examiner*—Gerald Gauthier
(74) *Attorney, Agent, or Firm*—Fenwick & West LLP (57) ABSTRACT

Session-based data, such as call detail accounting information, is tracked and distributed to a plurality of servers in a distributed telephony environment. One type of session is a telephone call between participants. Session-based data includes information about a session provided by the switches along the media path. Session-based data further includes information related to the session obtained from the application layer (e.g., user input metadata). A network proxy maintains a participant list to which the session data is distributed. The network proxy sends updates to the participants and determines the network status to implement fault tolerance of data distribution.

27 Claims, 11 Drawing Sheets

FIG. 11 US 7,386,114 B1

DISTRIBUTED SESSION-BASED DATA

CROSS-REFERENCE TO RELATED APPLICATIONS

The present invention relates to U.S. patent application Ser. No. 10/671,269, entitled "Server with Backup Capability for Distributed IP Telephony Systems," filed on Sep. 24, 2003.

TECHNICAL FIELD

This invention relates generally to distributed telephony, and more particularly, to fault-tolerant tracking and distribution of session-based data.

BACKGROUND

Enterprises often have several offices or call centers that are located in a plurality of locations. To interconnect all of these sites, enterprise telephony systems have been developed. Enterprise telephony systems consist of a distributed set of voice switches. This distributed hardware platform enables increased reliability and system capacity. Enterprise telephony systems also offer enterprise applications enabled by the integration of computer systems with telephony services. Call detail accounting is one example of such enterprise applications. Call detail accounting enables an enterprise to, for example, track, allocate, and document calls in a database.

While the underlying hardware in enterprise telephony systems is distributed, the software that supports the computer-integrated functionality is typically centralized. The software is generally implemented as a client-server environment in which the participants or clients (distributed telephony users) communicate directly with the server. For example, in a customer relationship management (CRM) application, a customer service representative may create a log about a customer interaction that is meant to be stored on a primary server. In many cases, the data reported by a participant is subsequently provided to another participant. For example, the log mentioned above may be concurrently presented to a customer service supervisor. Centralized computer-integrated features rely not only on a central server's application platform but also on the availability of the network that connects the switches, central server, and application services.

A centralized approach to providing computer-integrated features or functionality has a number of limitations. One problem is that centralized systems have very limited scalability. As more sites are added to an enterprise telephony system, the demand on the central server or logical cluster increases. In order to meet this increased demand, the central server must be upgraded regularly. While upgrading servers can be expensive, the alternative is far worse. If the server is not upgraded, users of the telephony system will experience severely decreased levels of service due to bottlenecks at the server and other problems.

Another problem with centralized systems is that they lack resilience. Computer-integrated features need to be fault tolerant and highly available. When these features rely on a central server, however, they are affected whenever the central server experiences a problem. One possible solution is to use both a primary server and a backup server. When the primary server is working correctly, it handles all incoming requests. The backup server is used only when the primary server confronts a network outage or computing problem. In other words, the backup server is used for failover redundancy. While this configuration is better than one containing a central server alone, recovery of session-based data during a failover transition can still be challenging. If the primary server failed while a user was trying to create session-based data that was meant to be stored on the primary server, the backup server may not be able to capture the call state accurately.

What is needed is a system and method for providing session-based data to participants in a distributed manner that provides high reliability and high availability to a plurality of participants. What is further needed is a system and method that uses peer-to-peer interactions to exchange session-based data.

SUMMARY OF THE INVENTION

Session-based data, such as call detail accounting information, is tracked and distributed to a plurality of Call Data Servers (CDSs) in a distributed telephony environment. One type of session is a telephone call between participants. Session-based data includes information about a session provided by the switches along the media path. Session-based data further includes information related to the session obtained from the application layer (e.g., user input metadata). A network proxy maintains a list of participants to which the session data is distributed. The network proxy sends updates to the participants and determines the network status to implement fault tolerance of data distribution.

Further features of the invention, its nature, and various advantages will be more apparent from the accompanying drawings and the following detailed description.

BRIEF DESCRIPTION OF THE DRAWINGS

The accompanying drawings illustrate several embodiments of the invention and, together with the description, serve to explain the principles of the invention.

DETAILED DESCRIPTION OF THE EMBODIMENTS

The present invention is now described more fully with reference to the accompanying figures, in which several embodiments of the invention are shown. The present invention may be embodied in many different forms and should not be construed as limited to the embodiments set forth herein. Rather, these embodiments are provided so that this disclosure will be thorough and complete and will fully convey the invention to those skilled in the art.

One skilled in the art will recognize that methods, apparatus, systems, data structures, and computer readable media implement the features, functionalities, or modes of usage described herein. For instance, an apparatus embodiment can perform the corresponding steps or acts of a method embodiment.

A. System Architecture

Figure 1:
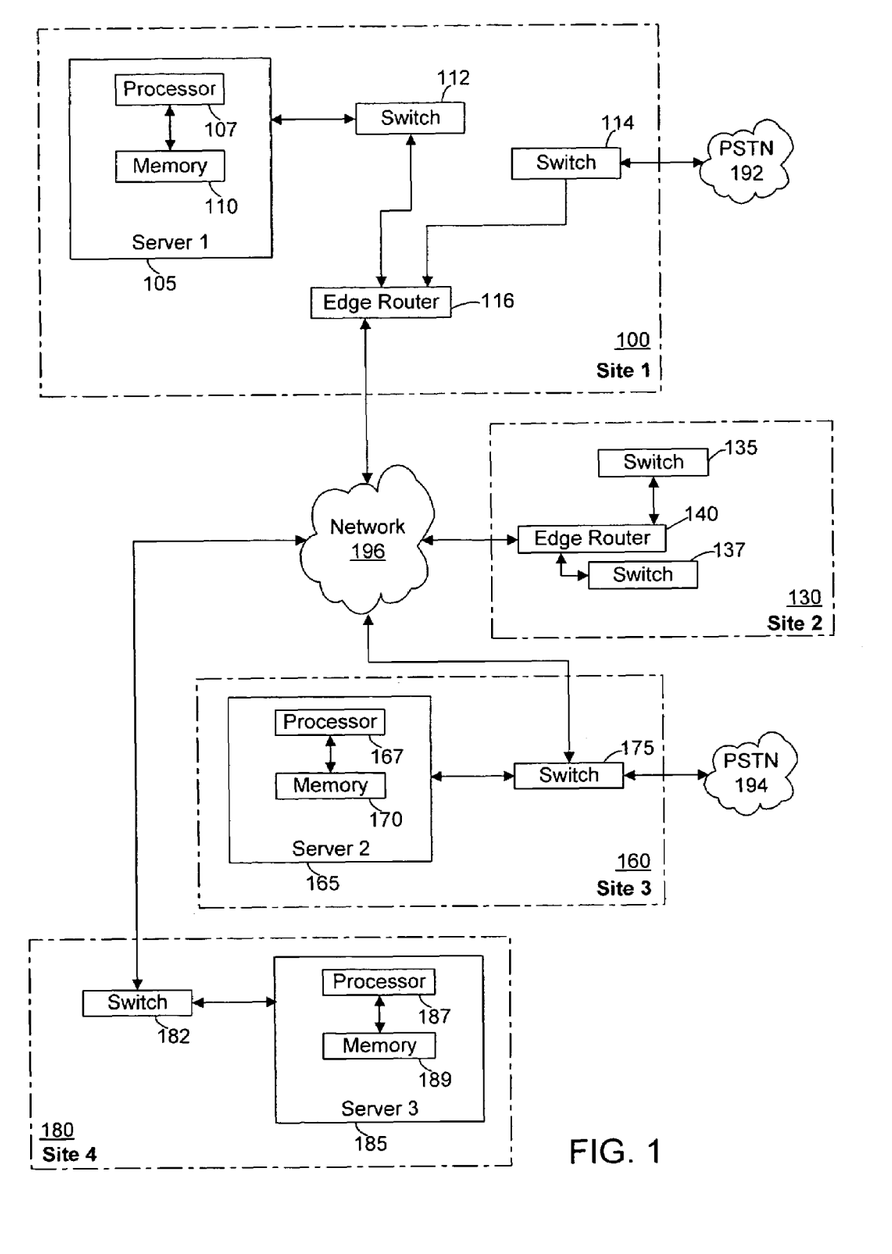
FIG. 1 is an illustration of a distributed telephony system architecture according to one embodiment of the present invention.

FIG. 1 is an illustration of a distributed telephony system architecture according to one embodiment of the present invention. A distributed telephony system consists of any number of servers and devices working cooperatively. The failure of a server or device is localized to calls in-progress at the point of failure. In-progress calls that bypass a failed unit and future calls are not affected by the failure. A failed unit may then be returned to service without centralized reconfiguration. A distributed architecture thus allows very large systems to be deployed without the complexity and CPU and network resource requirements of traditional failover methods.

The illustrated embodiment includes a first site 100, a second site 130, a third site 160, and a fourth site 180. As used herein, a site represents a grouping of resources. In the illustrated embodiment, each of the four sites 100, 130, 160, 180 are communicatively coupled via a network 196. One skilled in the art will note that sites 100, 130, 160, 180 can be physically distinct from each other or merely topology-related groupings that are not in physically distinct locations. The system architecture in FIG. 1 is used only by way of example. While FIG. 1 illustrates four sites, the present invention applies to any system architecture containing two or more sites.

The first site 100 includes an edge router 116, a first switch 112, a second switch 114, and a first server 105. An edge router may be used for, for example, providing local area connectivity between multiple switches, providing security, establishing a VPN, or guaranteeing quality of service. In the illustrated embodiment, the edge router 116 couples the first site 100 to the network 196 and provides local area connectivity for the first and second switches 112, 114. The first and second switches 112, 114 represent telephony switch devices to which a number of endpoints can be coupled. Switch endpoints may be analog, digital, or Voice over Internet Protocol (VoIP) and may take the form of servers, clients, or devices. Note that the first and second switches 112, 114 may be implemented as softswitches. A softswitch is similar to a hardware switch except that it runs on a server instead of on a device. In this embodiment, the first server 105 would also include a softswitch entity.

Further, the second switch 114 provides connectivity to the public switched telephone network (PSTN) 192 via an analog or digital trunk line (e.g., a T1 or E1 interface). In the illustrated configuration, the second switch 114 provides an interface for calls originating from or terminating on the PSTN 192. One skilled in the art will recognize that numerous configurations of switches and communications links are contemplated. For example, PSTN links can be coupled to multiple switches at several points within the topology.

The first server 105 includes a processor 107 and a memory 110. The processor 107 can be a conventional processing device, such as a general-purpose microprocessor. The memory 110 includes program instructions or functional modules that implement features of the present invention. The functional modules are described in further detail below and with reference to FIGS. 4-5.

In one embodiment of the present invention, one or more servers (e.g., the first server 105) are configured to implement features or functions of the present invention described below. More specifically, the first server 105 can execute an instance of telephony management software (TMS) as well as provide call data services (CDSs). A TMS instance presents a computer-telephony integration (CTI) view of the switch or switches managed by the TMS instance. A TMS instance can manage zero or more switches. Note that switches can operate without an associated TMS instance if CTI features are not being used. CDSs provide distributed access to session-based data, such as call detail records. Further details of the structure and function of TMS and CDS are provided below.

The second site 130 similarly includes a first switch 135, a second switch 137, and an edge router 140 to which the first and second switches 135, 137 are communicatively coupled. An edge router may be used for, for example, providing local area connectivity between multiple switches, providing security, establishing a VPN, or guaranteeing quality of service. In the illustrated embodiment, the edge router 140 is further coupled to the network 196 to provide the first and second switches 135, 137 connectivity to the other sites 100, 160, 180. Although, for convenience of illustration, the exemplary system architecture of FIG. 1 does not include endpoints, one skilled in the art will recognize that each of the first and the second switches 135, 137 are capable of having a number of endpoints communicatively coupled thereto. First and second switches 135, 137 can be implemented as, for example, switch devices or softswitches.

The configuration of the second site 130 demonstrates that a server is not required for each site. Although embodiments of the present invention exchange data between servers, the first and second switches 135, 137 of the second site 130 can be managed by a TMS instance running on, for example, the first server 105 that is illustrated in the first site 100. A call can involve more than one switch. For example, a call that originates from the PSTN 192 and terminates on an endpoint that is communicatively coupled to first switch 135 of the second site 130 involves two switches: the second switch 114 of the first site 100 and the first switch 135 of the second site 130. In addition, each switch can be managed by a different server.

The third site 160 similarly includes a switch 175 and a second server 165. The switch 175 can be implemented as, for example, a switch device or a softswitch and is communicatively coupled to the PSTN 194 in a manner that is similar to the second switch 114 of the first site 100. By being coupled to the PSTN 194, the switch 175 provides additional capability for endpoints to receive calls from or terminate calls to the PSTN 194. The switch 175 is also coupled to the network 196 to communicate with the other sites 100, 130, 180. In addition, the switch 175 may be coupled to a number of endpoints. While the illustrated embodiment does not contain an edge router, a different embodiment may contain an edge router for providing security, establishing a VPN, or guaranteeing quality of service. Since only one switch is present, an edge router would not be used to provide local area connectivity between multiple switches. As with the first server 105, the second server 165 comprises a processor 167 and a memory 170. As further described below, the second server 165 executes processes or instances of TMS and CDS.

The fourth site 180 includes a switch 182 and a third server 185. The third server 185 likewise includes a processor 187 and a memory 189. Similar to the third site 160, the fourth site 180 includes a single switch 182. The switch 182 can be implemented as, for example, a switch device or a softswitch. While the illustrated embodiment does not contain an edge router, a different embodiment may contain an edge router for providing security, establishing a VPN, or guaranteeing quality of service. Since only one switch is present, an edge router would not be used to provide local area connectivity between multiple switches. One skilled in the art will appreciate that additional networking devices can be added to the fourth site 180, for example, if needed to support additional endpoints, servers, or other systems.

In one embodiment of the present invention, the network 196 is a partially public or a wholly public network such as the Internet. The network 196 can also be a private network or include one or more distinct or logical private networks (e.g., virtual private networks or wide area networks). Additionally, the communication links to and from the network 196 can be wireline or wireless (i.e., terrestrial- or satellite-based transceivers). In one embodiment of the present invention, the network 196 is an IP-based wide or metropolitan area network.

B. Software Architecture

Figure 2:
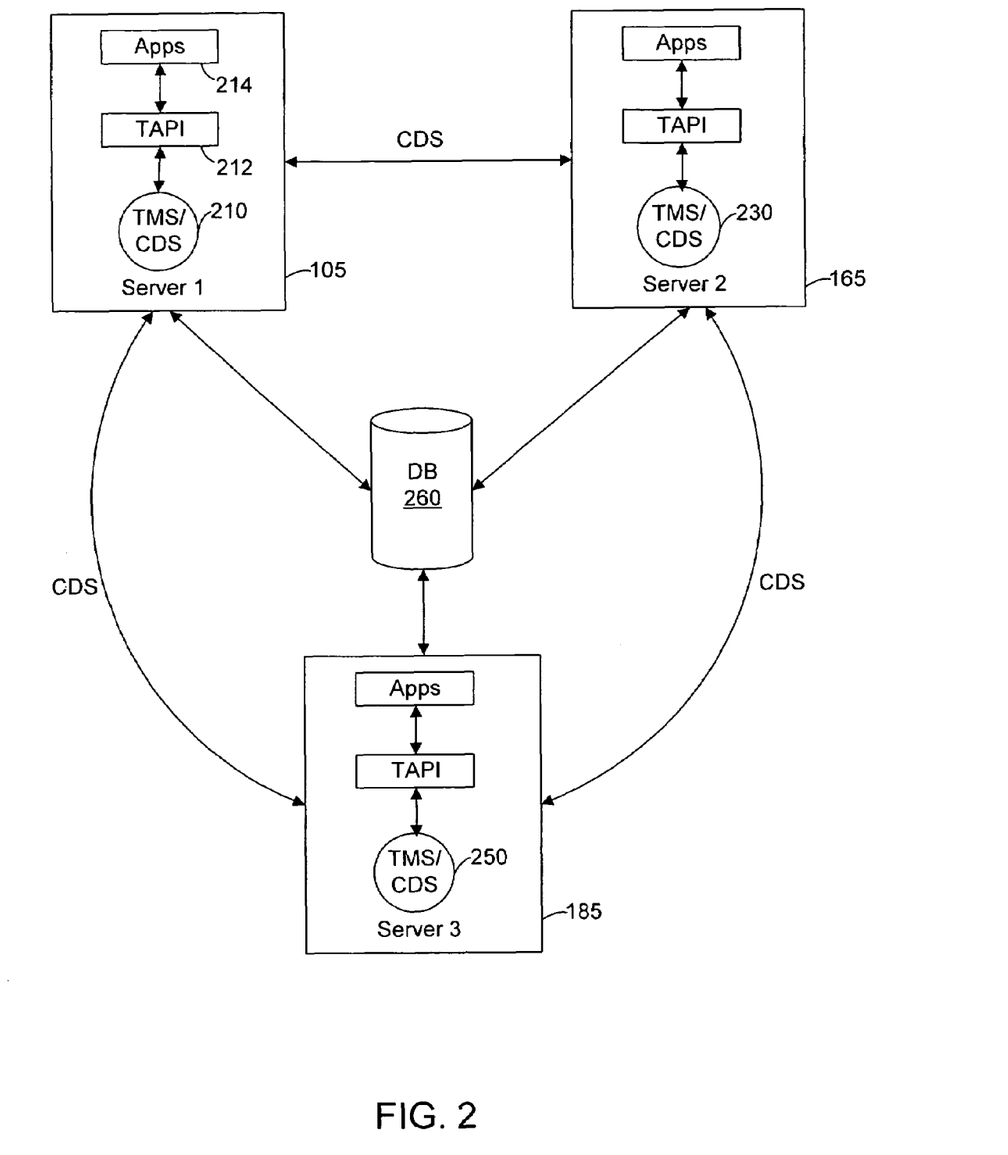
FIG. 2 is a diagram illustrating server architecture according to one embodiment of the present invention.

FIG. 2 is a diagram illustrating server architecture according to one embodiment of the present invention. The first server 105 includes a TMS process 210. The TMS process 210 provides a telephony application programming interface (TAPI) 212 for applications 214. The applications 214 use the TAPI 212 to exchange data with the TMS process 210.

The first server also includes a CDS instance running in conjunction with the TMS process 210. CDS is an application-layer communication that is capable of peer-to-peer interaction. As illustrated in FIG. 2, each of the servers 105, 165, 185 can exchange session data (or calldata) via the CDS mechanism. Calldata includes information that is gathered from the switches involved in handling a call (i.e., the media path). For call detail accounting purposes, calldata may include, among other things, the origination telephone number, the destination telephone number, and the duration of the call. Calldata may also include information about a call that is provided by applications 214. For example, a CRM user may wish to include notes about a call in the calldata.

The CDS instance where a call originates is called the owning CDS and is the repository of the calldata associated with that call. At the end of the call, the owning CDS sends the calldata to the database 260 for persistent storage. The contents of the calldata can be dynamic during the call. Each switch provides calldata to the owning server 105, 165, 185 (i.e., the server that is configured to manage that particular switch). For each server 105, 165, 185 to have a complete picture of the calldata for a given call or session, the servers 105, 165, 185 exchange messages to ensure that each server 105, 165, 185 has consistent calldata. More specifically, the owning CDS can receive calldata from and send calldata to a remote participant. As described below, timestamps are used to ensure consistency, to minimize event message size, and to eliminate duplicate entries. One advantage of this configuration is fault tolerance if one or more servers 105, 165, 185 should fail. The TMS processes 210, 230, 250 can monitor network health and update other participants' calldata as required.

In one embodiment, CDS instances are implemented as dynamically linked library functions that are called by the TMS processes 210, 230, 250. That is, the CDS instances may execute in the same process space as the TMS processes 210, 230, 250. Communication or data exchange between the TMS processes 210, 230, 250 and the CDS instances is further described below and with reference to FIG. 3.

First server 105 may also include one or more softswitches. As described above, a TMS process communicates with zero or more switches. For example, with reference to FIG. 1, the TMS process 210 executing on the first server 105 may manage the switches 112, 114, 135, and 137, as desired. That is, the switches 112, 114, 135, 137 can operate without an associated TMS process 210 if CTI features are not being used. Although applications 214 are illustrated as executing on the first server 105, the applications 214 may be distributed among computing devices as is known to one of skill in the art.

Likewise, the second server 165 and the third server 185 include TMS processes 230 and 250 respectively. The TMS processes 230, 250 also have associated CDS instances. Second server 165 and third server 185 may also include one or more softswitches.

1. CDS Instance

Figure 3:
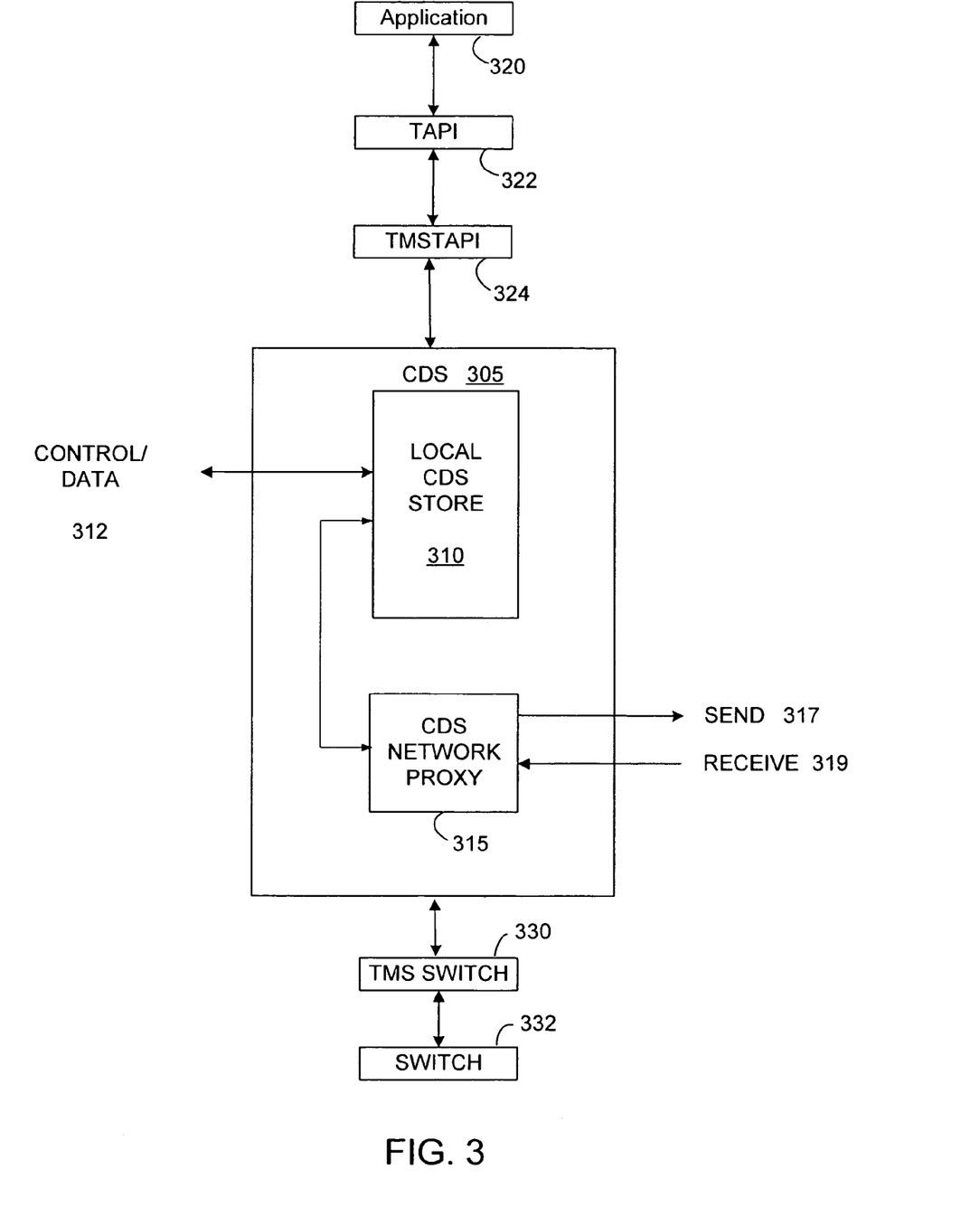
FIG. 3 is a diagram illustrating the architecture of a CDS instance according to one embodiment of the present invention.

FIG. 3 is a diagram illustrating the architecture of a CDS instance according to one embodiment of the present invention. The CDS instance or software module 305 includes a local CDS store 310 and a CDS network proxy 315. The local CDS store 310 exchanges data with an associated TMS, such as TMS process 210. In one embodiment, the local CDS store 310 uses a callback mechanism to populate a data structure in a TMS TAPI module 324. Likewise, the TMS TAPI module 324 uses a set mechanism to populate the data structure in the local CDS store 310. As described above, the TMS process 210 itself provides TAPI 322 and application 320 interfaces.

The network proxy 315 registers as a client with the local CDS store 310. The network proxy 315 also registers and interfaces with remote CDS instances, for example, those running on the second and third servers 165, 185. The network proxy 315 receives 319 updates from remote CDS instances and sends 317 updates to remote CDS instances. Calldata from the switch 332 is passed to a TMS SWITCH module 330. The TMS SWITCH module 330 registers with the local CDS store 310 in order to exchange data.

The local CDS store 310 also includes a control/data interface 312 that offers several functions. An initialize function initializes the CDS instance when the associated TMS process 210, 230, 250 starts. A finalize function shuts down the CDS instance when the associated TMS process 210, 230, 250 stops. A register function registers interest in a particular call identifier (callID) at a particular TMS/CDS location. A callID is a unique identifier (e.g., a token or GUID) that is assigned by the switch at which a call originates. The callID is passed from switch to switch in order to uniquely identify the call within the media path. Passing the callID between switches is done using a call signaling protocol. The protocol may be standards-based, such as Session Initiation Protocol (SIP), Media Gateway Control Protocol (MGCP), or H.323, or proprietary. The callID is also passed to the TMS process 210, 230, 250 for call management and integration purposes. An unregister function unregisters interest in a particular callID. An update function updates the calldata for a particular callID. A callback function is called to report changes in the calldata and registration information.

2. Program Code Modules

Figure 4:
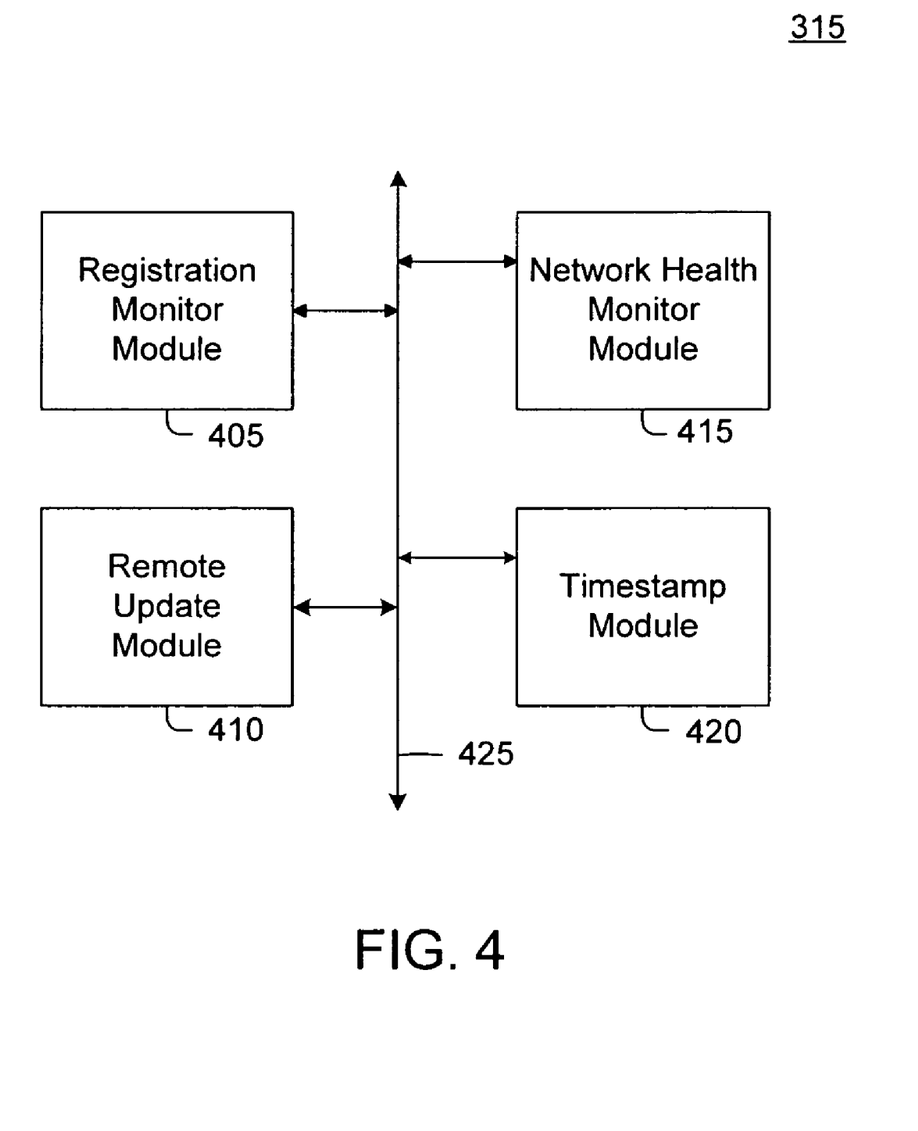
FIG. 4 is an illustration of one embodiment of program code modules for the CDS network proxy 315.

FIG. 4 is an illustration of one embodiment of program code modules for the CDS network proxy 315. In the illustrated embodiment, the CDS network proxy 315 includes a registration monitor module 405, a remote update module 410, a network health monitor module 415, and a timestamp module 420. A data bus 425 communicatively couples each of the modules 405, 410, 415, 420.

The modules 405, 410, 415, 420 include program instructions that can be executed on, for example, processor 107 to implement the features or functions of the present invention. The modules 405, 410, 415, 420 are typically stored in a memory, such as memory 110. For the servers 105, 165, 185, the program instructions can be distributed on a computer readable medium or storage volume. The computer readable storage volume can be available via a public network, a private network, or the Internet. Program instructions can be in any appropriate form, such as source code, object code, or scripting code.

The registration monitor module 405 handles registration and unregistration of remote participants. The registration monitor module 405 receives a registration request including a particular callID when a remote participant is interested in receiving calldata updates for that callID. The registration monitor module 405 also interfaces with the local CDS store 310 to register the network proxy 315 as a client that is interested in all callIDs. The registration monitor module 405 builds a participant list for each callID from the registration/unregistration requests received. The participant list enables the network proxy 315 to send calldata updates to the remote CDS instances that are participating (i.e., interested in the call).

The remote update module 410 manages the sending and receiving of calldata to and from remote participants. When the network proxy 315 is registered as a local participant, the remote update module 410 emulates a local participant to store and to retrieve information from the local CDS store 310. The processes associated with the remote update module 410 are described in additional detail below.

The network health monitor module 415 includes functions to determine the status of remote CDS instances and general network availability. The network health monitor module 415 can periodically poll the servers 105, 165, 185 or the TMS processes 210, 230, 250 within the servers 105, 165, 185 to determine whether the TMS processes 210, 230, 250 are still alive. In another embodiment, the network health monitor module 415 regularly receives "I'm alive" messages from CDS instances. If the message is not received within a predetermined amount of time (e.g., 30 seconds), the network health monitor module 415 informs the server that a network outage has potentially occurred. If the remote participant does not re-register its interest in the callID within a specified time frame (e.g., 5 minutes), the registration monitor module 405 unregisters the remote participant.

The timestamp module 420 coordinates the time base for the remote participants. The timestamp used for a particular call is based on the server time where the owning CDS instance is running. For a remote participant, the timestamp of the owning CDS is simulated. On each interaction between a client and the owning CDS, the current Coordinated Universal Time (UTC) of the owning CDS is returned to the client. The timestamp module 420 at the client computes the difference between the UTC time of the local (client) server and the UTC time returned from the owning server. The difference is stored at the client and added to the local UTC time whenever a local client needs a timestamp. One skilled in the art will appreciate that the timestamp module 420 keeps track of the latest timestamp received from the owning CDS instance.

Figure 5:
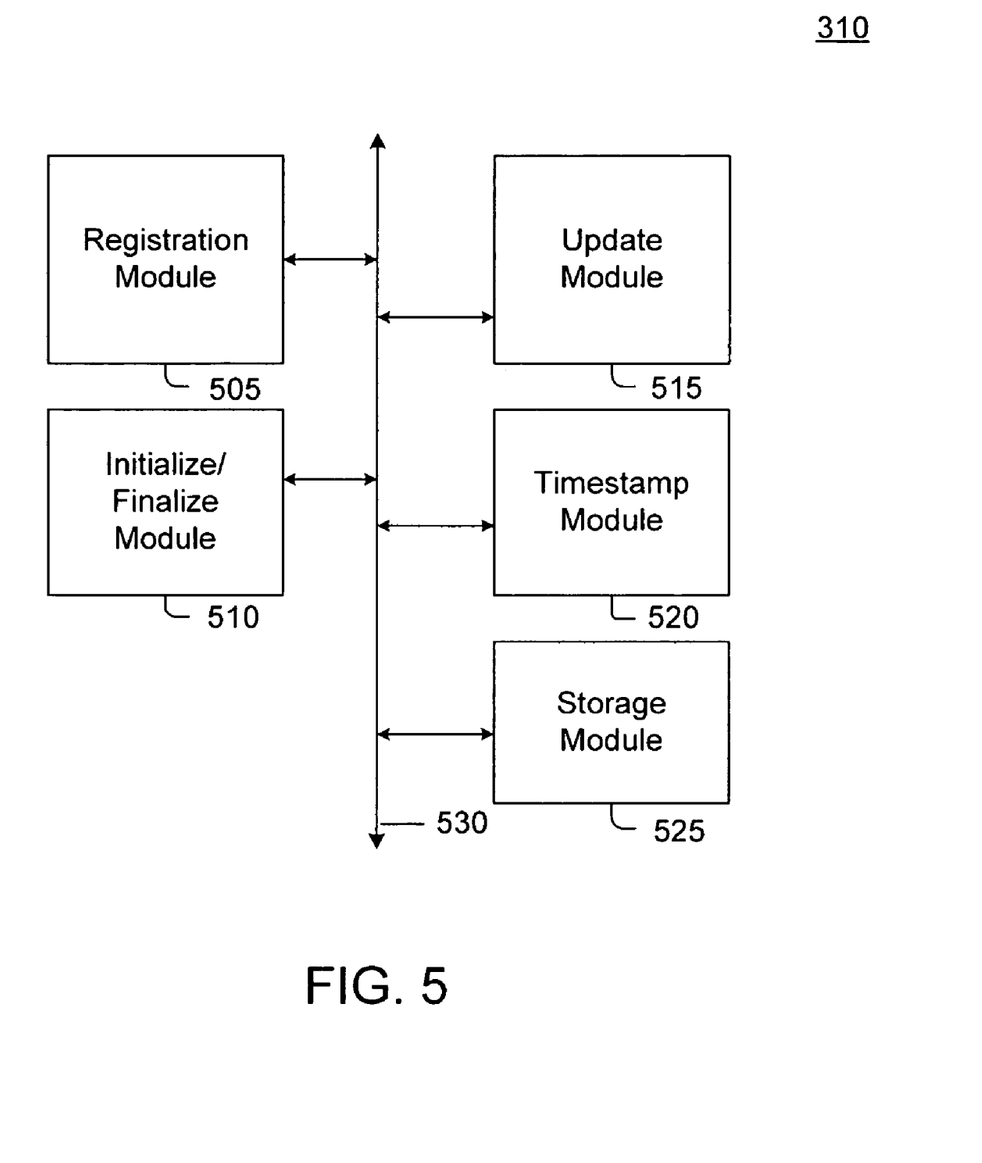
FIG. 5 is an illustration of one embodiment of program code modules for the local CDS store 310.

FIG. 5 is an illustration of one embodiment of program code modules for the local CDS store 310. In the illustrated embodiment, the local CDS store 310 includes a registration module 505, an initialize/finalize module 510, an update module 515, a timestamp module 520, and a storage module 525. A data bus 530 communicatively couples each of the modules 505, 510, 515, 520, 525.

The modules 505, 510, 515, 520, 525 include program instructions that can be executed on, for example, processors 107, 167, 187 to implement the features or functions of the present invention. The modules 505, 510, 515, 520, 525 are typically stored in a memory, such as memory 110. For the servers 105, 165, 185, the program instructions can be distributed on a computer readable medium or storage volume. The computer readable storage volume can be available via a public network, a private network, or the Internet. Program instructions can be in any appropriate form, such as source code, object code, or scripting code.

The registration module 505 manages local client connections to local CDS store 310. The CDS network proxy 315 registers with the registration module 505 as a local client. The initialize/finalize module 510 interacts with the local TMS process 210, 230, 250 to start/stop the associated CDS instance. The update module 515 processes calldata to update the data store and to retrieve data from the data store. The update module 515 provides calldata to the participants of the local CDS instance that are interested in the particular callID. Of course, the CDS network proxy 315 can be registered as one of the local participants that is interested in all callIDs. The update module 515 provides calldata entries (e.g., properties and logs) depending on the type of event. For example, in response to a registration event, the calldata includes all of the entries. For an update, the calldata contains only those entries that have been changed since the last update. The update module 515 coordinates with the timestamp module 520 to determine whether an entry has already been processed to eliminate redundant messages being sent to the CDS participants. At the end of a call, the calldata contains all entries.

The timestamp module 520 controls the assignment of timestamps to calldata entries. One skilled in the art will appreciate that timestamps are used to ensure data consistency throughout the distributed system. When a client registers for a callID, it sends the timestamp (if any) of calldata it may currently be holding (e.g., due to a reconnect, network outage, or other failure). At registration time, the update module 515 of the CDS instance sends calldata it is holding for the callID back to the registrant. Of course, if the registrant is a remote CDS instance, the network proxy 315 sends the calldata. The timestamp module 520 also enables the update module 515 to perform filtering of incoming calldata to avoid storing redundant information in the storage module 525.

The storage module 525 provides data storage services for the other functional modules 505, 510, 515, 520. The storage module 525 processes data storage and retrieval requests for calldata entries and objects. At the end of a call, the owning TMS process 210, 230, 250 (the TMS process associated with the switch that originated the call) accesses the storage module 525 to retrieve the calldata entries associated with the callID to write the calldata to the database 260 for archiving or other processing. For example, a call accounting process may later retrieve information from the database 260 to generate a cost report.

C. Methods

Figure 6:
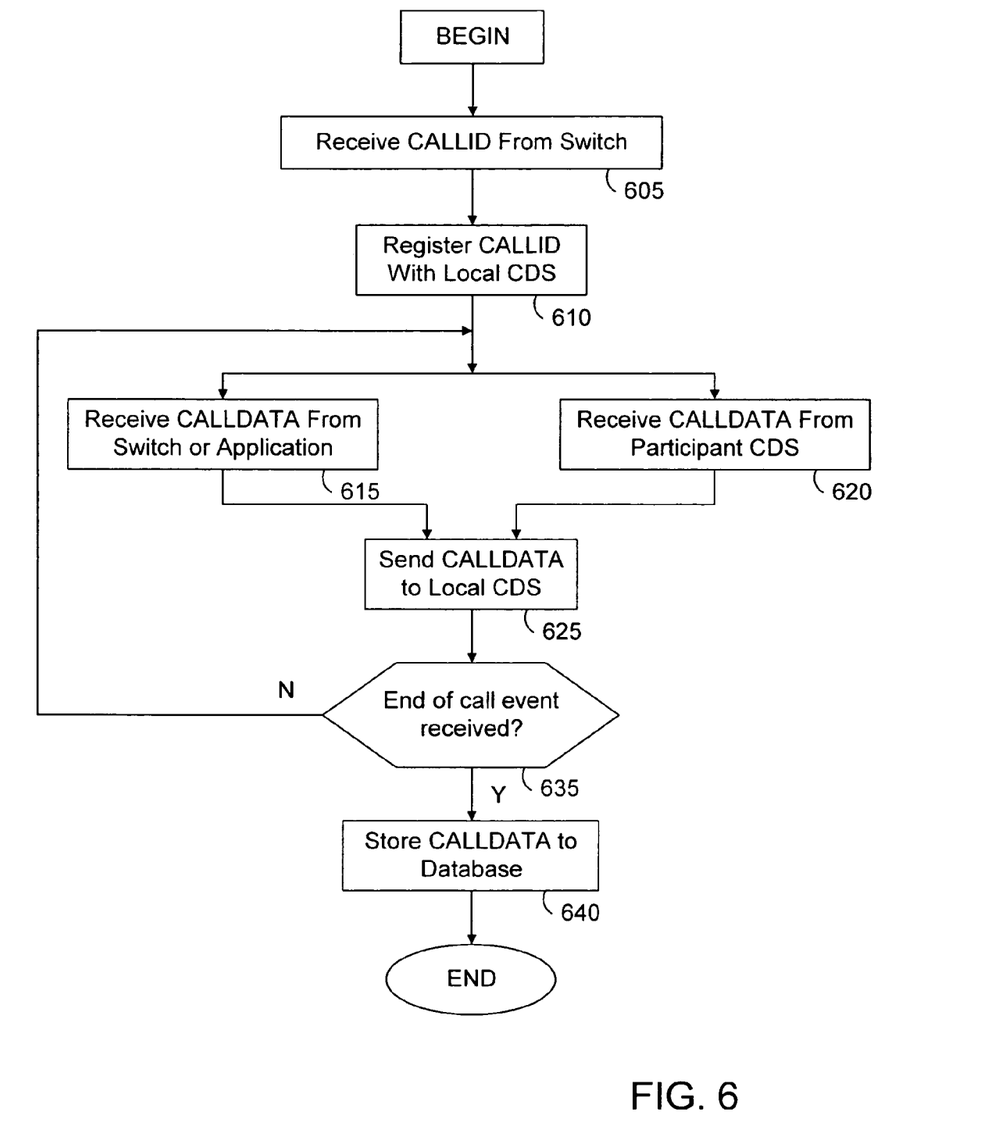
FIG. 6 illustrates a method for distributing calldata performed by an owning TMS process according to one embodiment of the present invention.

FIG. 6 illustrates a method for distributing calldata performed by an owning TMS process according to one embodiment of the present invention. The illustrated process begins with the TMS process 210, 230, 250 receiving 605 a callID from the switch where the call originates. The TMS process then registers 610 the callID with the local CDS instance that is associated with the TMS process. One skilled in the art will note that many switches can be involved for each call or session. Each of the switches involved in the call sends a registration request that the owning TMS process receives to build a participant list. Because a plurality of TMS processes 210, 230, 250 can be used to manage various switches, some of the registered participants may be located in sites that are different from the owning TMS process.

The owning TMS process then receives 615 calldata from the switches or the application layer as described above. Alternatively, the owning TMS process may receive 620 calldata from participant CDS instances. The owning TMS process sends 625 the received calldata to the local CDS instance to store the calldata and capture the call state. The local CDS instance then sends calldata to local participants, one of which may be the network proxy 315, in order to distribute the calldata (see FIGS. 8 and 10).

The TMS process then determines 635 whether an end of call event has been received. If an end of call event has not been received, the TMS process returns to steps 615, 620 to receive additional calldata. If an end of call event has been received, the owning TMS process writes 640 the accumulated calldata to the database 260 and then ends.

Figure 7:
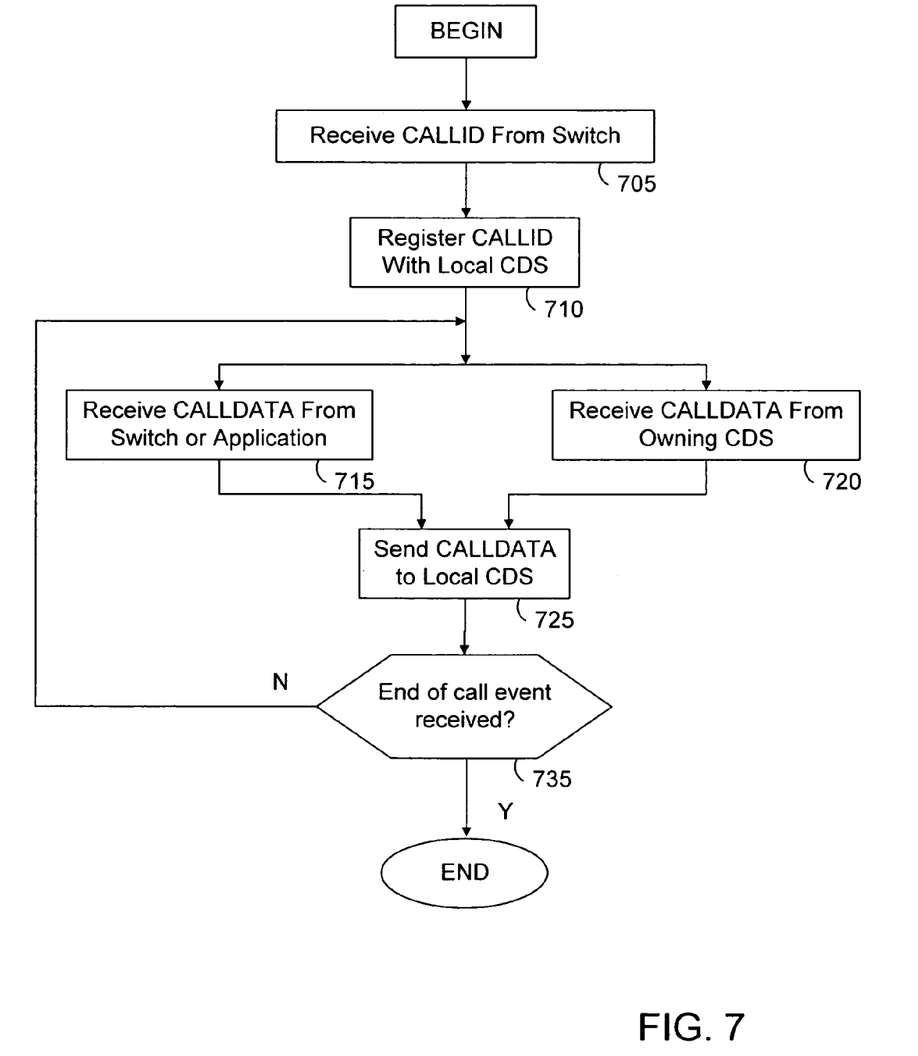
FIG. 7 illustrates a method for distributing calldata performed by a participant TMS process according to one embodiment of the present invention.

FIG. 7 illustrates a method for distributing calldata performed by a participant TMS process according to one embodiment of the present invention. The illustrated process begins with the participant TMS process 210, 230, 250 receiving 705 a callID from a switch that is participating in the call or session. The process then registers 710 the callID received with the local CDS instance. The participant TMS receives 715 calldata from switches and applications. Alternatively, the participant TMS may receive 720 calldata from the owning CDS instance. The process then sends 725 calldata that is received to the local CDS instance. Then, the local CDS instance sends the calldata to the local participants (see FIGS. 9 and 11).

The process determines 735 whether an end of call event has been received. If an end of call event has not been received, the process returns to steps 715, 720 to receive additional calldata. If an end of call event has been received, the process ends.

Figure 8:
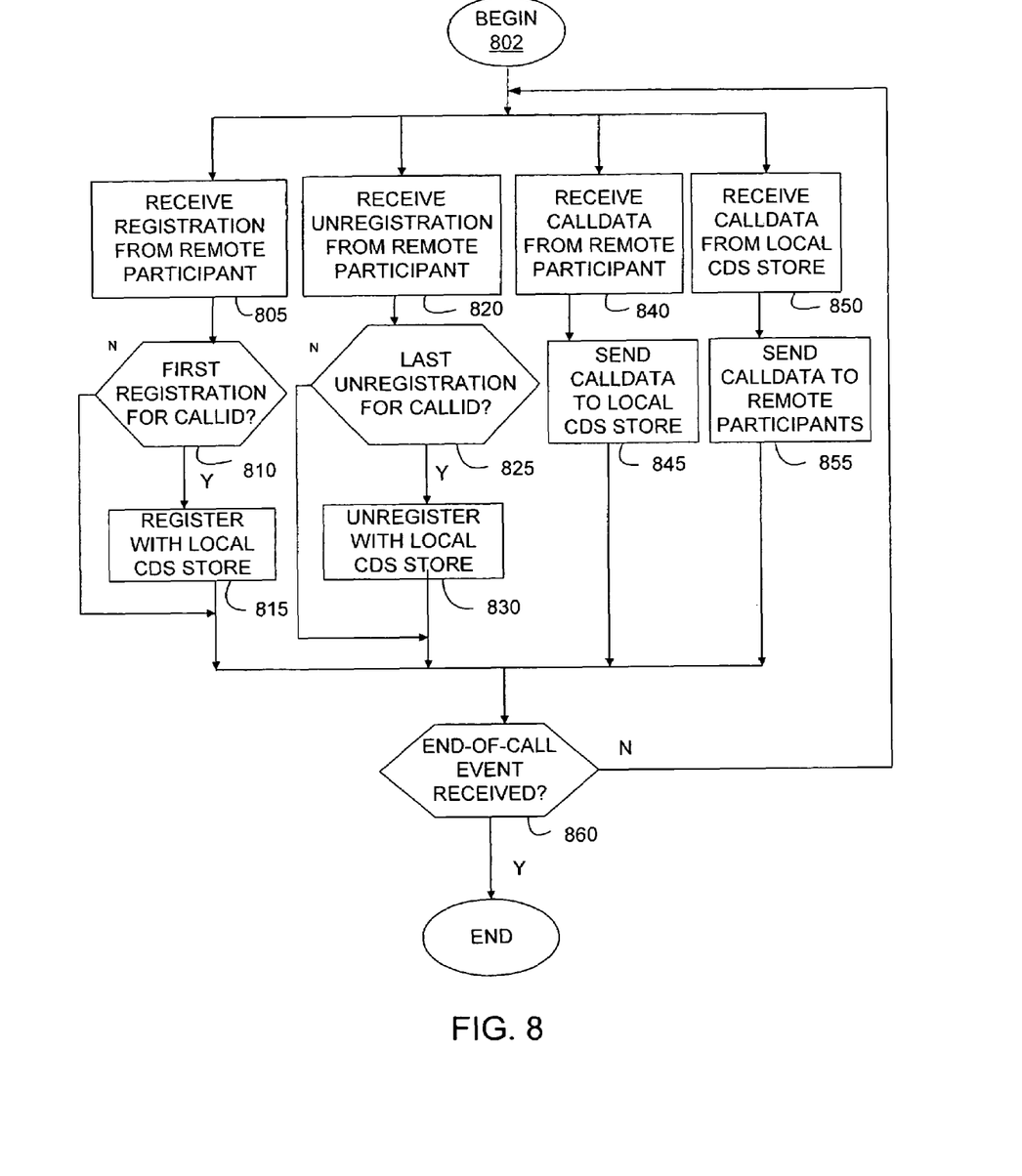
FIG. 8 illustrates a method for handling registrations, unregistrations, and calldata performed by the CDS network proxy of the owning CDS instance according to one embodiment of the present invention.

FIG. 8 illustrates a method for handling registrations, unregistrations, and calldata performed by the CDS network proxy of the owning CDS instance according to one embodiment of the present invention. The illustrated process begins 802 with receiving 805 a registration from a remote participant. The process then determines 810 whether the registration for a call is the first from a remote participant. If the registration for a call is the first from a remote participant, the CDS network proxy 315 registers 815 with the local CDS store 310. If not, then the process returns to the beginning 802 to perform additional tasks.

Alternatively, the process may receive 820 an unregistration from a remote participant and determine 825 whether any remote participants are remaining for the call. If unregistrations have been received for all of the remote participants, the CDS network proxy 315 unregisters 830 with the local CDS store 310. Otherwise, the process returns to the beginning 802 to perform additional tasks.

When the process receives 840 calldata from a remote participant, it sends 845 the calldata to the local CDS store 310. When the process receives 850 calldata from the local CDS store, it sends 855 the calldata to the remote participants on the participant list. The process continues to handle registrations, unregistrations, and calldata until it is determined 860 that an end of call event has been received. The process ends responsive to the end of call event message.

Figure 9:
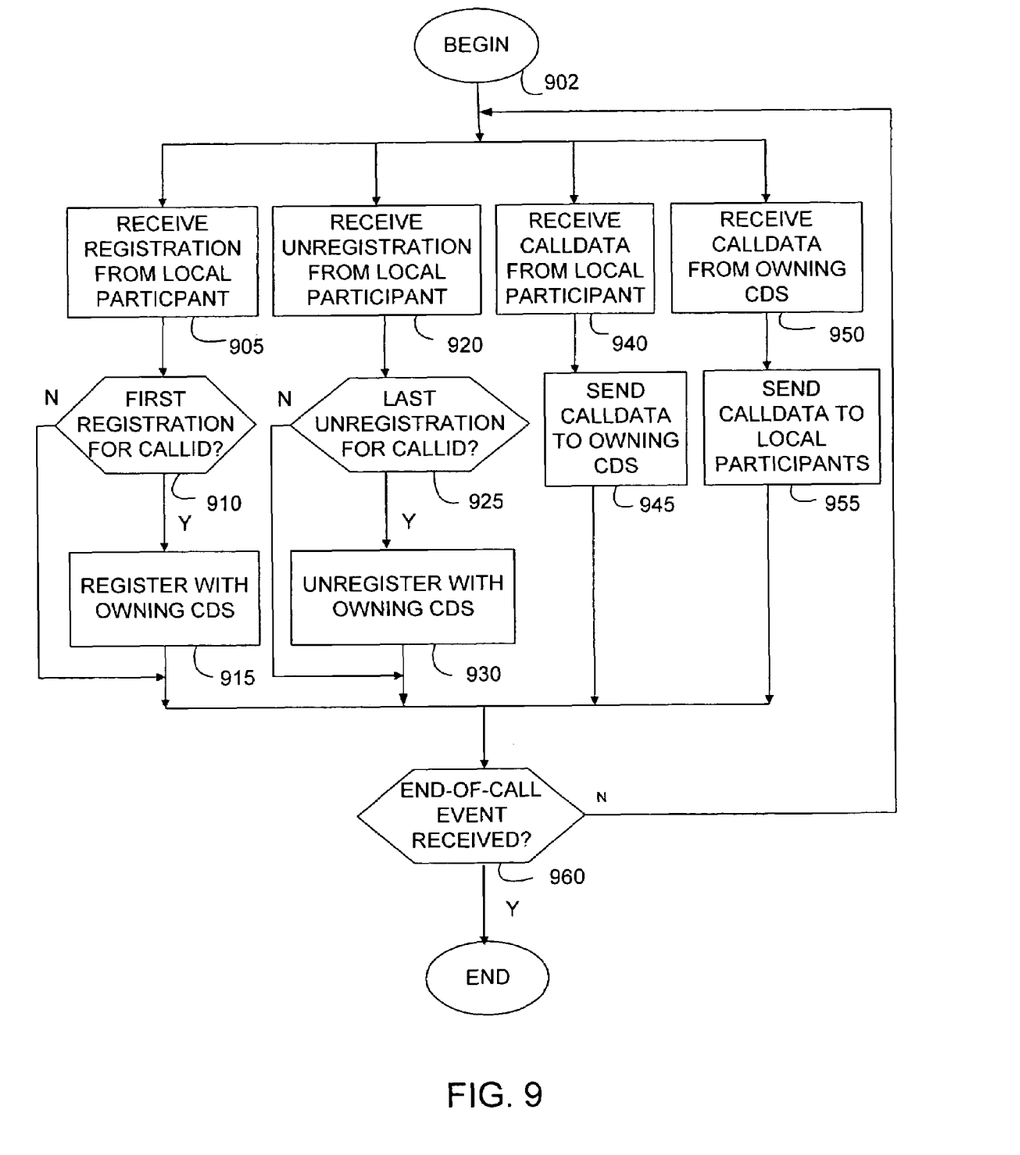
FIG. 9 illustrates a method for handling registrations, unregistrations, and calldata performed by the CDS network proxy of a participant CDS instance according to one embodiment of the present invention.

FIG. 9 illustrates a method for handling registrations, unregistrations, and calldata performed by the CDS network proxy of a participant CDS instance according to one embodiment of the present invention. The illustrated process begins 902 with receiving 905 a registration from a local participant. The process then determines 910 whether the registration for a call is the first from a local participant. If the registration for a call is the first from a local participant, the CDS network proxy 315 registers 915 with the owning CDS instance. If not, then the process returns to the beginning 902 to perform additional tasks.

Alternatively, the process may receive 920 an unregistration from a local participant and determine 925 whether any local participants are remaining for the call. If unregistrations have been received for all of the local participants, the CDS network proxy 315 unregisters 930 with the owning CDS instance. Otherwise, the process returns to the beginning 902 to perform additional tasks.

When the process receives 940 calldata from a local participant, it sends 945 the calldata to the owning CDS store 310. When the process receives 950 calldata from the owning CDS store, it sends 955 the calldata to the local participants on the participant list. The process continues to handle registrations, unregistrations, and calldata until it is determined 960 that an end of call event has been received. The process ends responsive to the end of call event message.

Figure 10:
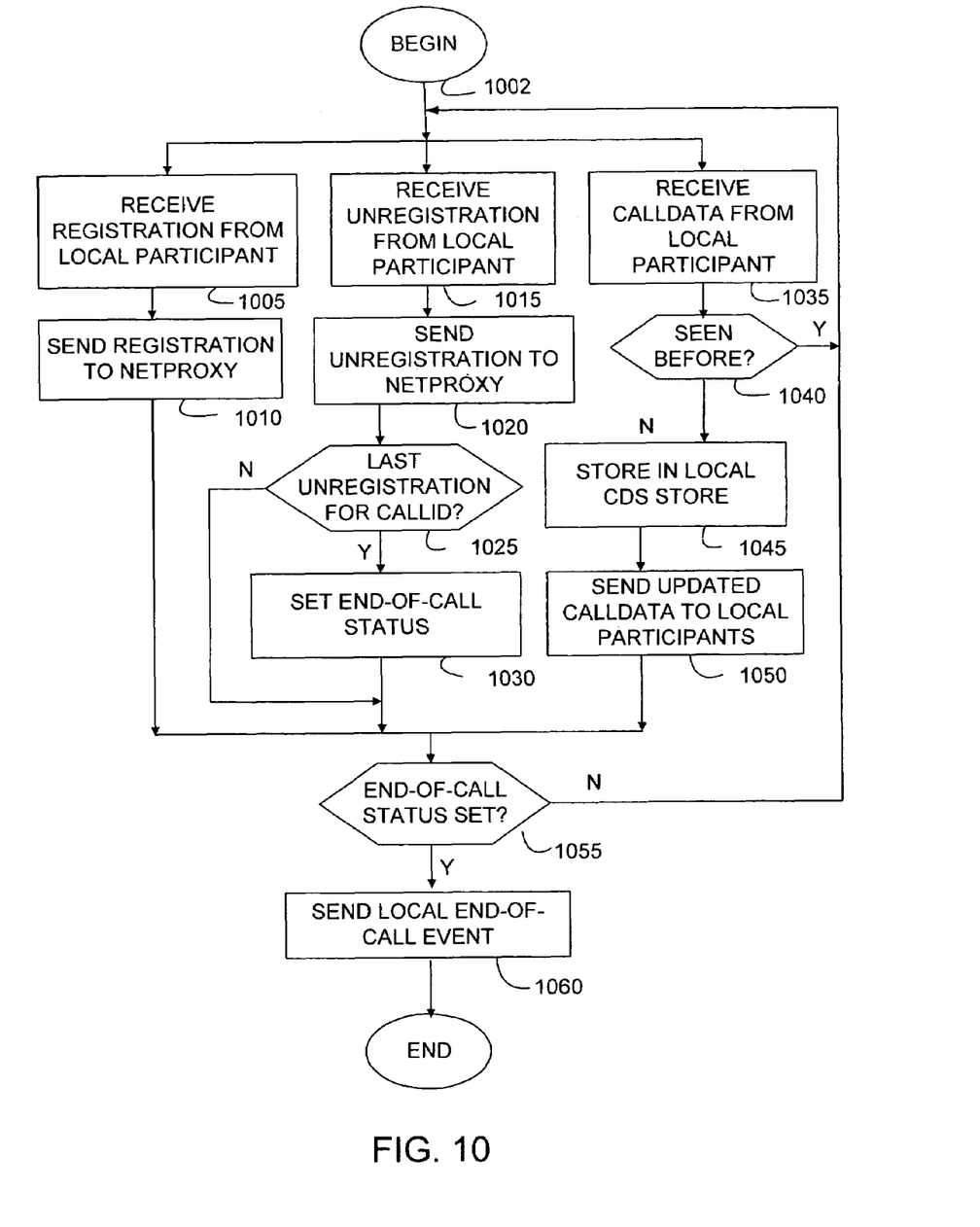
FIG. 10 illustrates a method of handling registrations, unregistrations, and calldata performed by the local CDS store of an owning CDS instance according to one embodiment of the present invention.

FIG. 10 illustrates a method of handling registrations, unregistrations, and calldata performed by the local CDS store of an owning CDS instance according to one embodiment of the present invention. The illustrated process begins 1002 with receiving 1005 a registration for a call from a local participant (which can include the CDS network proxy 315). Information about the registration is sent 1010 to the CDS network proxy 315. Alternatively, the process may receive 1015 an unregistration from a local participant and send 1020 that unregistration to the CDS network proxy 315. The process then determines 1025 whether the last unregistration has been received for a particular callID.

If the last unregistration has been received, then the process sets 1030 end of call status. In one embodiment, the process delays a predetermined amount of time (e.g., 30 seconds) to wait for additional registrations before setting 1030 end of call status. This behavior is advantageous because in a networked environment, it is possible that all currently registered participants will unregister (e.g., due to unexpected connection difficulties) while the call is still active. In this case, the owning CDS instance will keep the calldata active in case another participant re-registers.

When the end of call status is set 1055, the process sends 1060 the end of call event message to interested local participants. Otherwise, calldata continues to be received 1035 from local participants (including the CDS network proxy 315). When the process receives 1035 calldata, the process determines 1040 whether it has seen the particular calldata before. As described above, the determination uses timestamps to compare the calldata to that which has already been received. One skilled in the art will appreciate that the most recent modification of a property (i.e., entry) replaces an earlier modification of the same property. If the calldata has been seen before, it is disregarded and the process returns to the beginning 1002. If the calldata has not been seen before, it is stored 1045 in the local CDS store 310 and then sent 1050 as a calldata update to other local participants (including the CDS network proxy 315 for distribution to remote participants).

Figure 11:
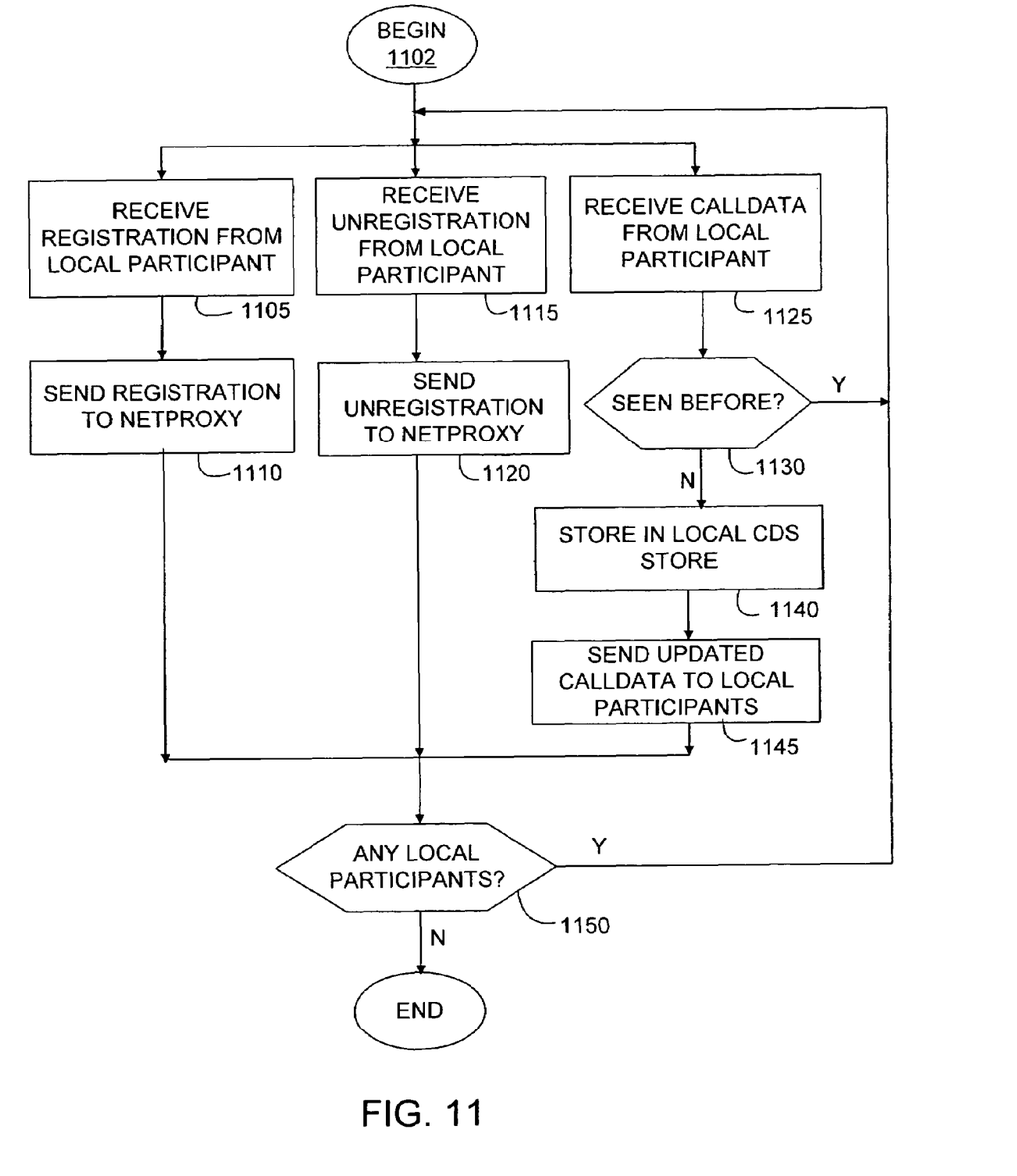
FIG. 11 illustrates a method of handling registrations, unregistrations, and calldata performed by the local CDS store of a participant CDS instance according to one embodiment of the present invention.

FIG. 11 illustrates a method of handling registrations, unregistrations, and calldata performed by the local CDS store of a participant CDS instance according to one embodiment of the present invention. The illustrated process begins 1102 with receiving 1105 a registration for a call from a local participant. Information about the registration is sent 1110 to the local CDS network proxy 315. Alternatively, the process may receive 1115 an unregistration from a local participant and send. 1120 that unregistration to the local CDS network proxy 315.

When the process receives 1125 calldata from a local participant, the process determines 1130 whether it has seen the particular calldata before. As described above, the determination uses timestamps to compare the calldata to that which has already been received. If the calldata has been seen before, it is disregarded and the process returns to the beginning 1102. If the calldata has not been seen before, it is stored 1140 in the local CDS store 310 and then sent 1145 as a calldata update to other local participants (including the CDS network proxy 315 for distribution to remote participants).

The process then determines 1150 whether any local participant remains. If it does, the process returns to the beginning 1102. If it does not, the process ends.

Having described embodiments of distributed session-based data (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

What is claimed is:

1. A method for distributing call data, the method comprising:
    receiving, at a server, from a participant, a registration request including a call identifier;
    receiving, at the server, from at least one of a switch and an application, call data associated with the call identifier;
    determining whether the call data had been previously received and determining whether a timestamp assigned to the call data matches a timestamp assigned to call data that had been previously received, wherein the timestamp assigned to the call data is calculated by adding a time difference between a timestamp of an origin of the call data and a timestamp of a CDS instance on the server to a timestamp of the origin of the call data; and
    responsive to a determination that the call data had not been previously received, sending the call data to the participant.

2. The method of claim 1 further comprising:
    receiving, at the server, an end of session message; and
    writing the call data to a database responsive to the end of session message.

3. The method of claim 1 further comprising:
    receiving, at the participant, the call data; and
    storing the call data in a local data store.

4. The method of claim 3 wherein storing the call data in the local data store comprises:
    determining whether the call data had been previously received; and
    responsive to a determination that the call data had not been previously received, storing the call data in the local data store.

5. The method of claim 4 wherein determining whether the call data had been previously received comprises:
    determining whether a timestamp assigned to the call data matches a timestamp assigned to call data that had been previously received.

6. The method of claim 5 wherein the timestamp assigned to the call data is calculated by adding a time difference between a timestamp of an origin of the call data and a timestamp of a CDS instance on the participant to a timestamp of a CDS instance on the participant.

7. The method of claim 3 further comprising:
    receiving, at the participant, supplemental call data from a local participant; and
    sending the supplemental call data to the server.

8. The method of claim 7 wherein sending the supplemental call data to the server comprises:
    determining whether the supplemental call data had been previously received; and
    responsive to a determination that the supplemental call data had not been previously received, sending the supplemental call data to the server.

9. The method of claim 8 wherein determining whether the supplemental call data had been previously received comprises:
    determining whether a timestamp assigned to the supplemental call data matches a timestamp assigned to supplemental call data that had been previously received.

10. The method of claim 9 wherein the timestamp assigned to the supplemental call data is calculated by adding a time difference between a timestamp of an origin of the supplemental call data and a timestamp of a CDS instance on the participant to a timestamp of a CDS instance on the participant.

11. The method of claim 1 wherein the call identifier comprises a callID.

12. The method of claim 1 wherein the server includes an owning TMS process.

13. The method of claim 1 wherein the participant includes a participant TMS process.

14. The method of claim 1 wherein the call represents a telephone call between participants.

15. The method of claim 1 wherein the server and the participant are associated with different sites.

16. The method of claim 1 wherein the participant comprises one element of a group containing a switch and a server.

17. An apparatus for distributing call data, the apparatus comprising:
    an interface module configured to receive, at a server, from a participant, a registration request including a call identifier;

an update module configured to receive, at the server, from at least one of a switch and an application, call data associated with the call identifier, and to send the call data to the participant; and a timestamp module configured to calculate a time difference between a timestamp of a CDS instance on the server and a timestamp of a CDS instance on the participant.

18. The apparatus of claim 17 wherein the update module is further configured to receive, from the participant, the call data.

19. The apparatus of claim 18 further comprising:

a storage module configured to store the call data in a local data store.

20. The apparatus of claim 19 wherein the interface module is further configured to receive an end of session message; and the storage module is configured to write the call data to a database responsive to the end of session message.

21. The apparatus of claim 18 wherein the update module is further configured to receive, at the participant, supplemental session data from a local participant; and to send the supplemental session data to the server.

22. The apparatus of claim 17 wherein the call identifier comprises a callID.

23. The apparatus of claim 17 wherein the server includes an owning TMS process.

24. The apparatus of claim 17 wherein the participant includes a participant TMS process.

25. The apparatus of claim 17 wherein the call represents a telephone call between participants.

26. The apparatus of claim 17 wherein the server and the participant are associated with different sites.

27. The apparatus of claim 17 wherein the participant comprises one element of a group containing a switch and a server.

* * * * *